US010164429B1

(12) United States Patent
Combs

(10) Patent No.: US 10,164,429 B1
(45) Date of Patent: Dec. 25, 2018

(54) ELECTRICAL POWER PLANT

(71) Applicant: Cloyd J. Combs, Wimberley, TX (US)

(72) Inventor: Cloyd J. Combs, Wimberley, TX (US)

( * ) Notice: Subject to any disclaimer, the term of this patent is extended or adjusted under 35 U.S.C. 154(b) by 0 days.

(21) Appl. No.: 15/706,626

(22) Filed: Sep. 15, 2017

(51) Int. Cl.
| | | |
|---|---|---|
| H02J 3/38 | (2006.01) |
| H02J 1/10 | (2006.01) |
| H02S 10/12 | (2014.01) |
| H02S 10/10 | (2014.01) |
| H02S 50/00 | (2014.01) |
| H02S 20/23 | (2014.01) |
| F03D 1/00 | (2006.01) |
| H01M 8/0656 | (2016.01) |
| H01M 16/00 | (2006.01) |
| C25B 1/04 | (2006.01) |
| F03D 3/00 | (2006.01) |
| H02J 1/00 | (2006.01) |

(52) U.S. Cl.
CPC .............. *H02J 1/10* (2013.01); *C25B 1/04* (2013.01); *F03D 1/00* (2013.01); *F03D 3/005* (2013.01); *H01M 8/0656* (2013.01); *H01M 16/003* (2013.01); *H02J 3/386* (2013.01); *H02J 3/387* (2013.01); *H02S 10/10* (2014.12); *H02S 10/12* (2014.12); *H02S 20/23* (2014.12); *H02S 50/00* (2013.01); *H02J 2001/004* (2013.01)

(58) Field of Classification Search
CPC H02J 3/383; H02J 3/385; H02S 10/12; F03D 9/007
See application file for complete search history.

(56) References Cited

U.S. PATENT DOCUMENTS

| | | | | |
|---|---|---|---|---|
| 5,658,448 A | * | 8/1997 | Lasich | C25B 1/02 205/628 |
| 8,330,296 B2 | | 12/2012 | Ottman | |
| 2009/0301687 A1 | * | 12/2009 | Watts | F24J 2/42 165/48.2 |
| 2009/0321244 A1 | * | 12/2009 | Smith | B01J 19/127 204/157.52 |
| 2010/0257795 A1 | * | 10/2010 | Pagliasotti | E04F 13/007 52/173.1 |
| 2011/0089698 A1 | | 4/2011 | Ahmadi | |

(Continued)

FOREIGN PATENT DOCUMENTS

WO 2013010550 A1 1/2013

*Primary Examiner* — Fritz M Fleming
(74) *Attorney, Agent, or Firm* — Scheinberg & Associates, P.C.; Michael O. Scheinberg

(57) ABSTRACT

An Electrical Power Plant (EPP) derives power through a semi-cone roof and platform serving as a source of distributed electrical/storage energy. Electric power is generated through renewable resource systems mounted upon and within the semi-cone roof. Two paths generate electrical power/heat. A Direct path uses solar panels and wind turbines. An Indirect path has a Compact Solar Heat Generator (CSHG) that generates electrical power and/or heat through a High Temperature Electrolysis (HTE) system to produce hydrogen and oxygen which are fed into Fuel Cells to produce electrical power, pure water and waste heat. The waste heat and pure water are then fed into the Computer Distributer Controller Tank (CDCT) as part of cogenerated energy. These paths are the power input to the EPP that provides a distributed source of electrical/storage power. The CDCT also provides a path for hot water to the Hot Water Heater or Boiler.

16 Claims, 11 Drawing Sheets

(56) References Cited

U.S. PATENT DOCUMENTS

| | | | |
|---|---|---|---|
| 2011/0100433 A1* | 5/2011 | Jonczyk | H02S 20/10 |
| | | | 136/251 |
| 2011/0113705 A1* | 5/2011 | Raczkowski | E01C 1/002 |
| | | | 52/173.3 |
| 2012/0228963 A1 | 9/2012 | Ursu et al. | |
| 2015/0162799 A1* | 6/2015 | Ilan | H02K 7/025 |
| | | | 310/74 |

\* cited by examiner

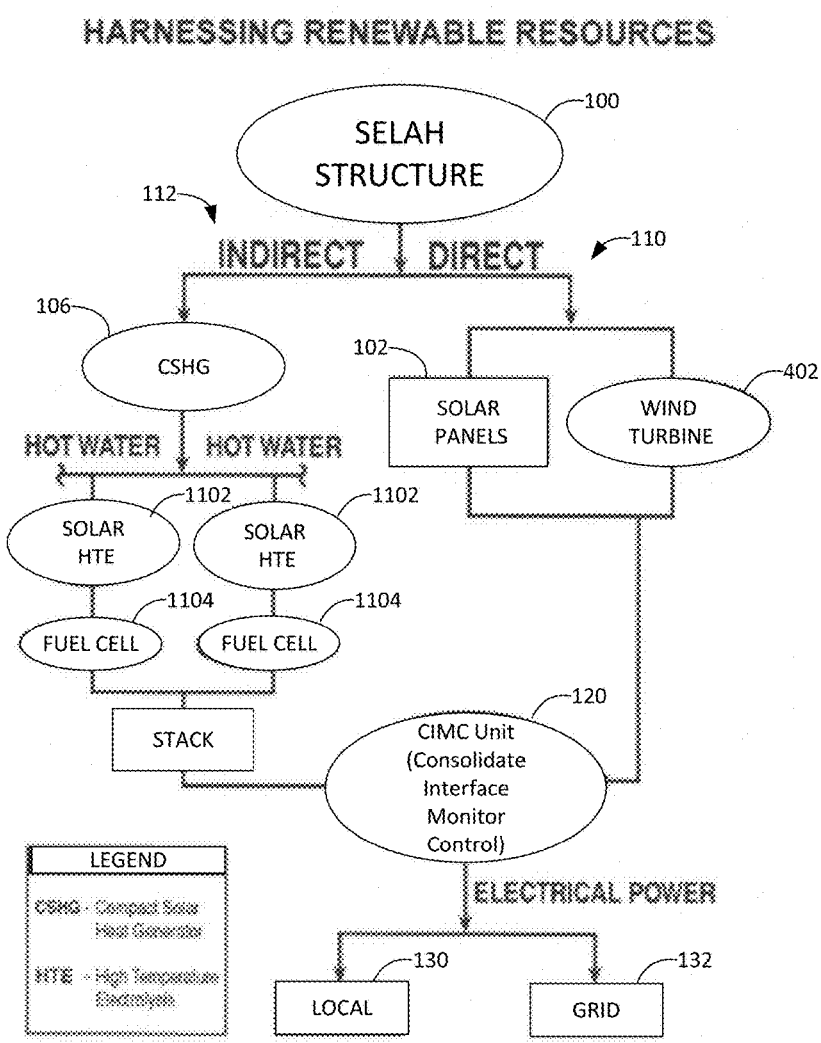

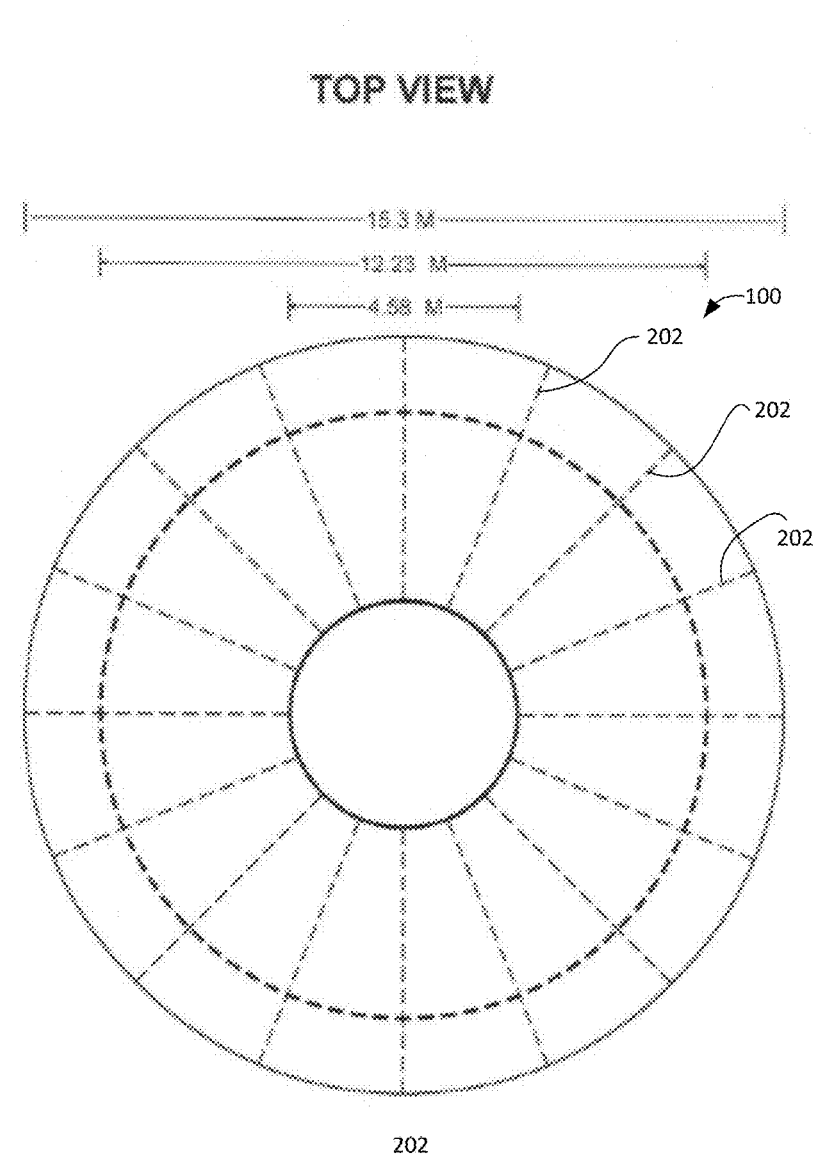
Fig. 2 SEMI-CONE ROOF

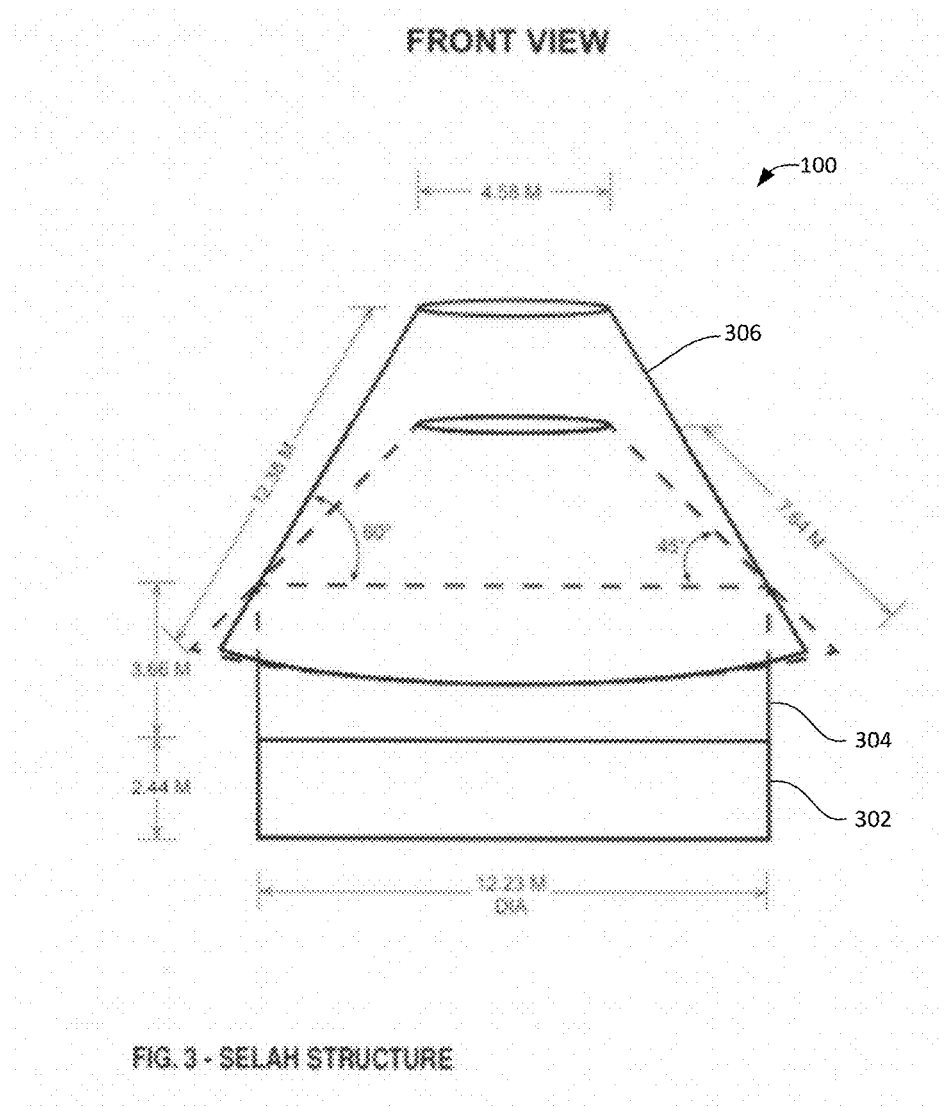
FIG. 3 - SELAH STRUCTURE

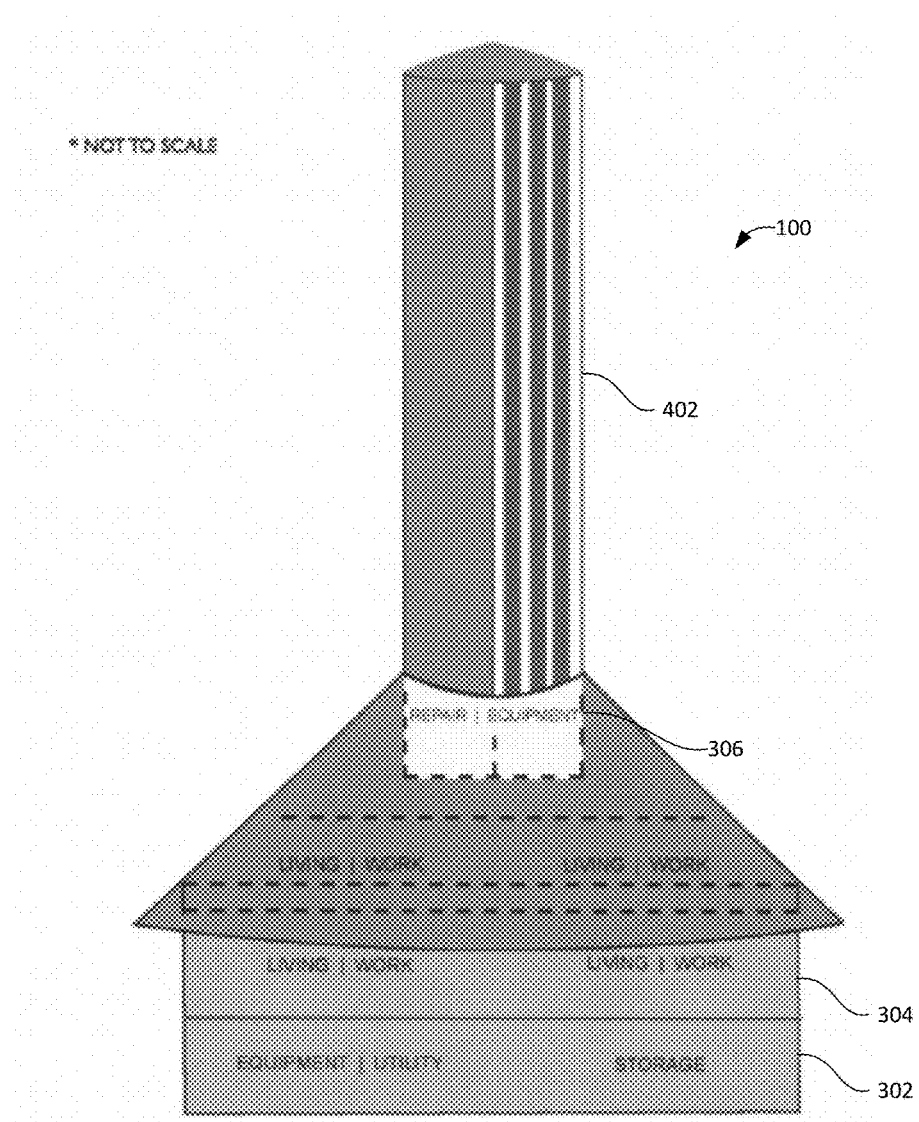
Fig. 4 - VERTICAL DRIVE TURBINE ATOP STRUCTURE

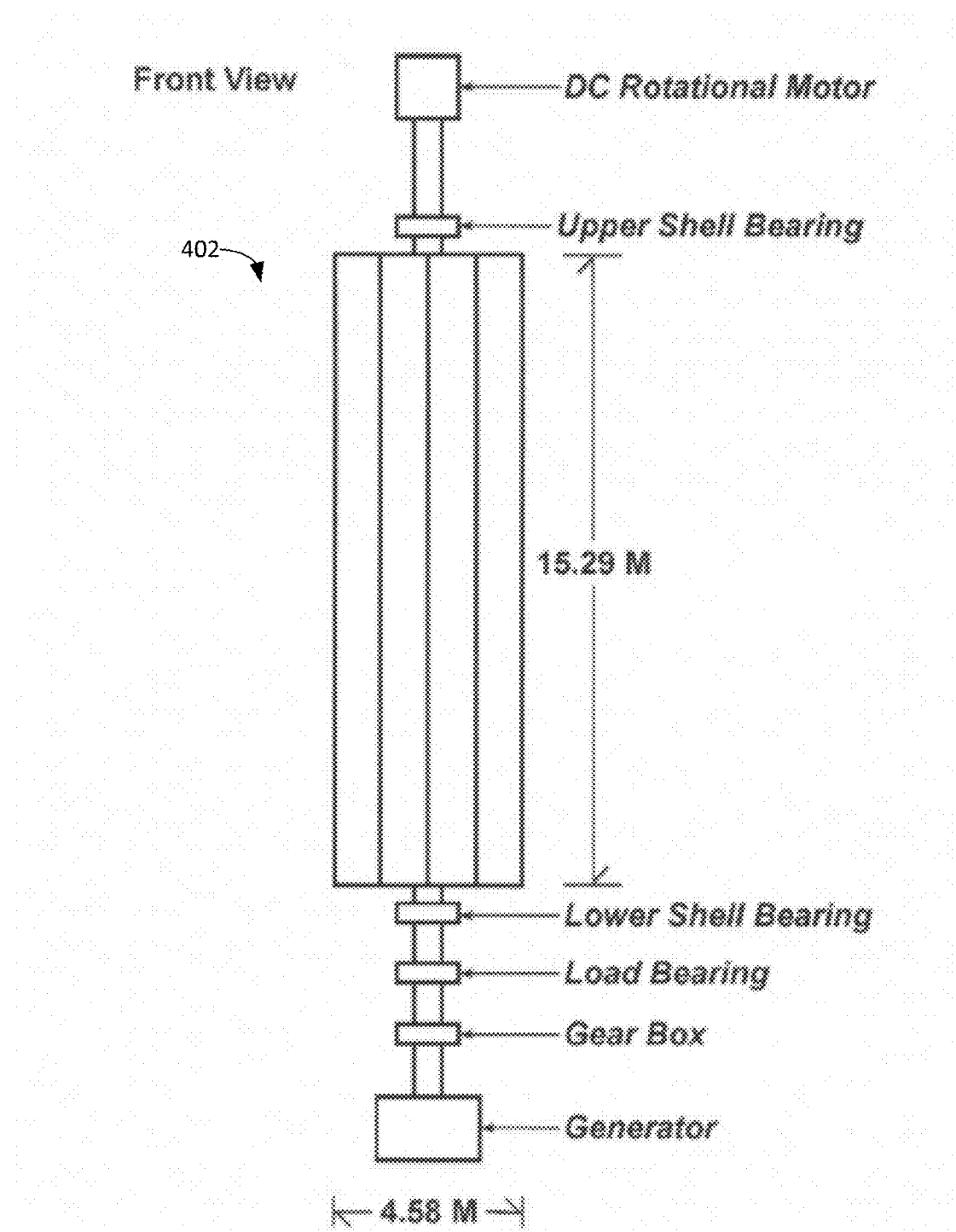
FIGURE 5 - VERTICAL DRIVE WIND TURBINE

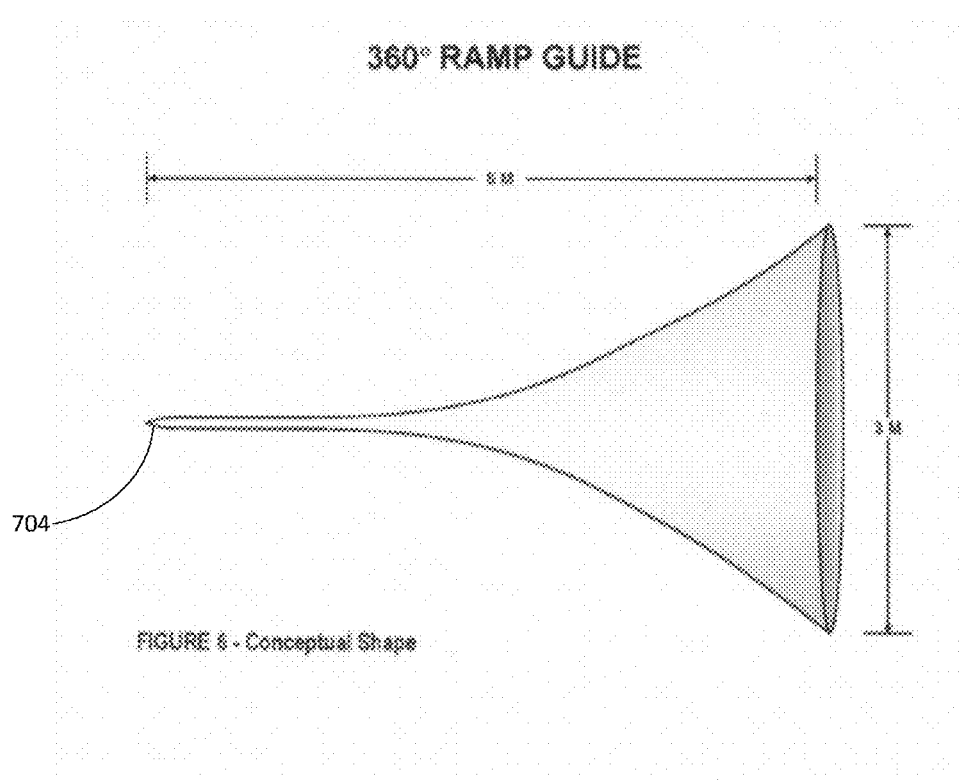
FIGURE 6 - Conceptual Shape

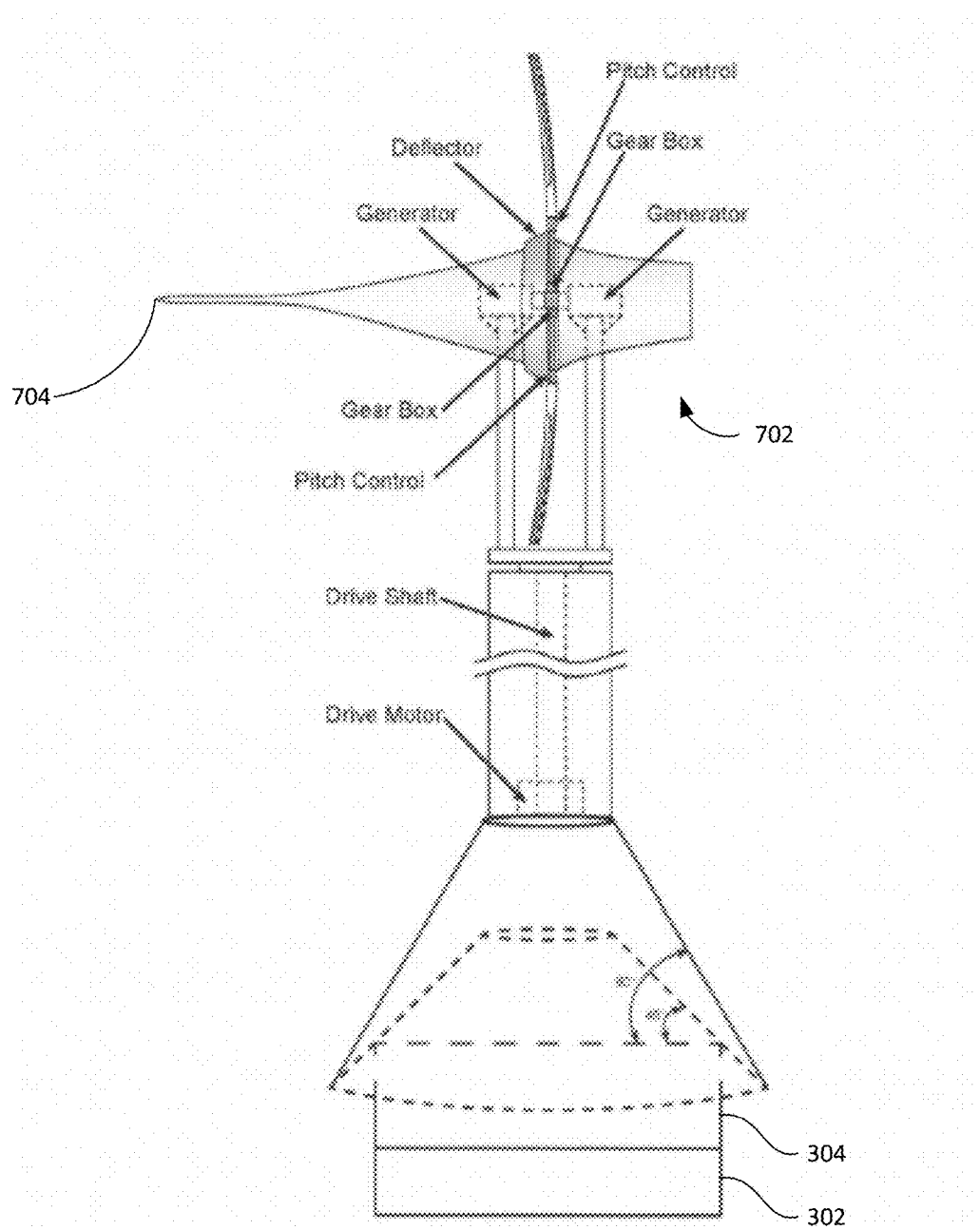
Fig. 7 - SIDE VIEW - HORIZONTAL DRIVE ATOP STRUCTURE

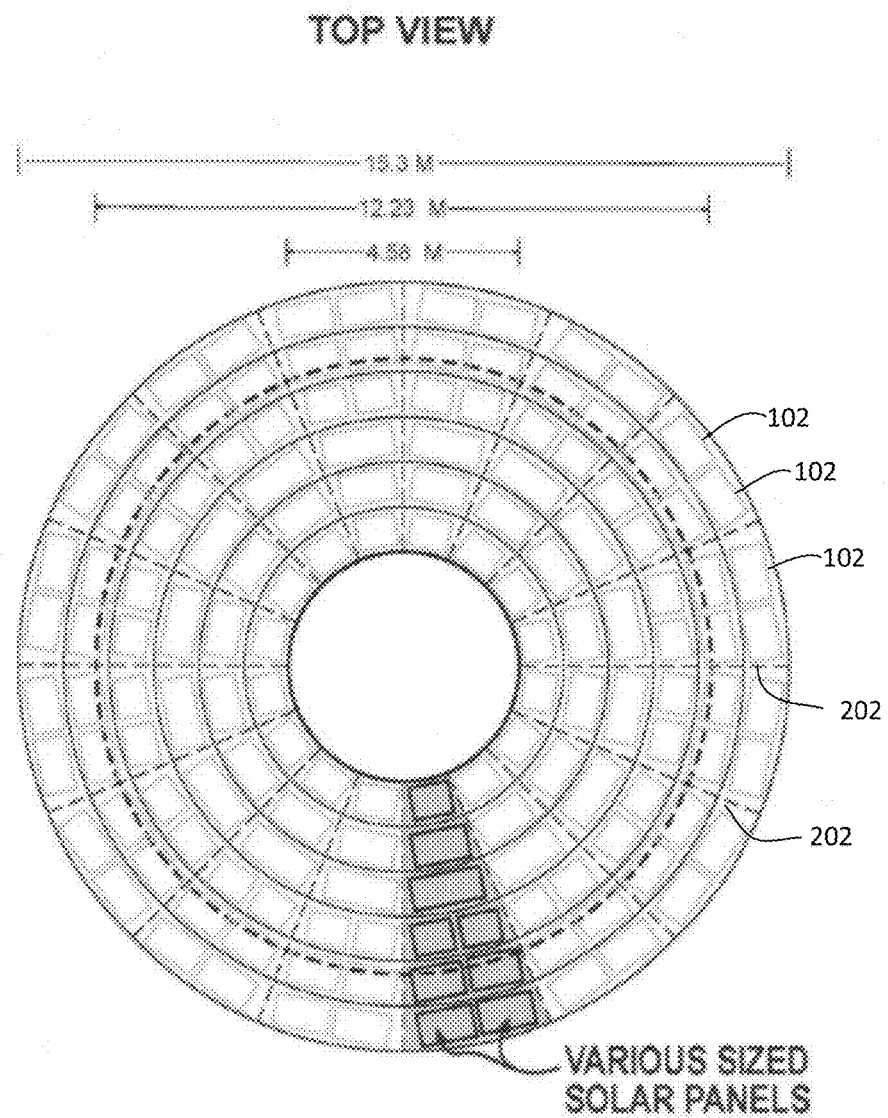
FIG. 8 - SOLAR ARRAY DETAIL

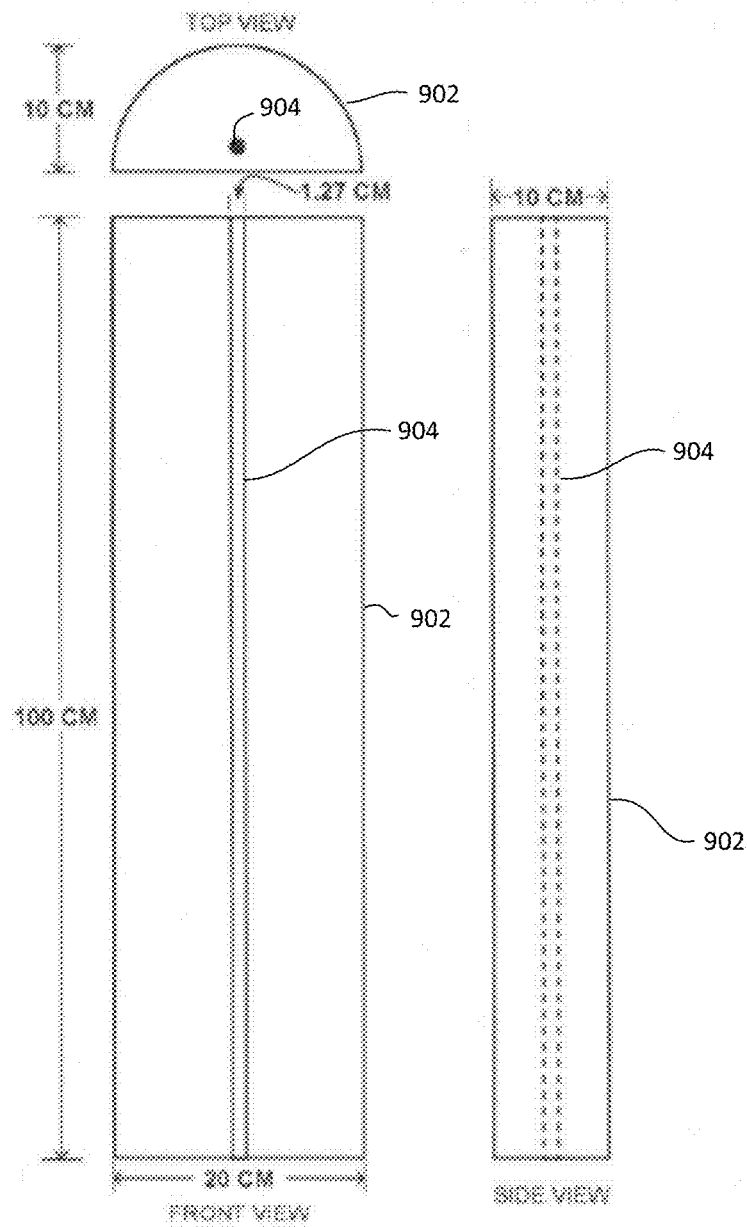
FIGURE 9 - PARABOLIC TROUGH

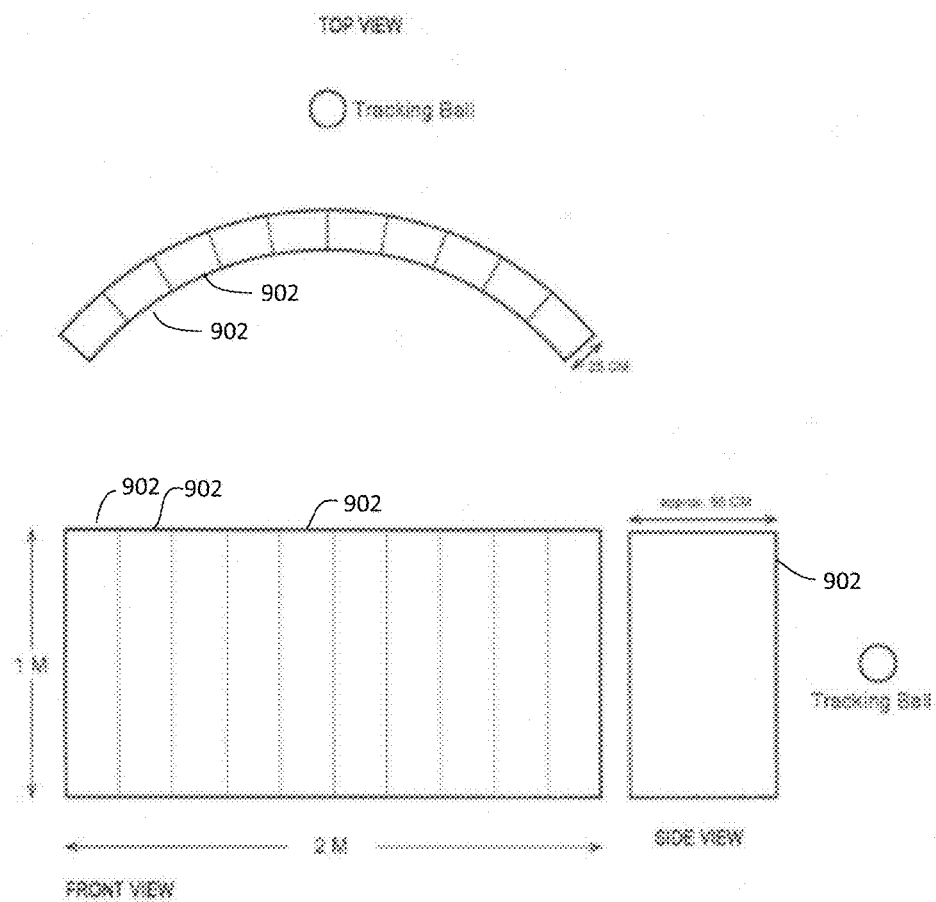
FIG. 10 - CSHG TYPICAL ARRAY

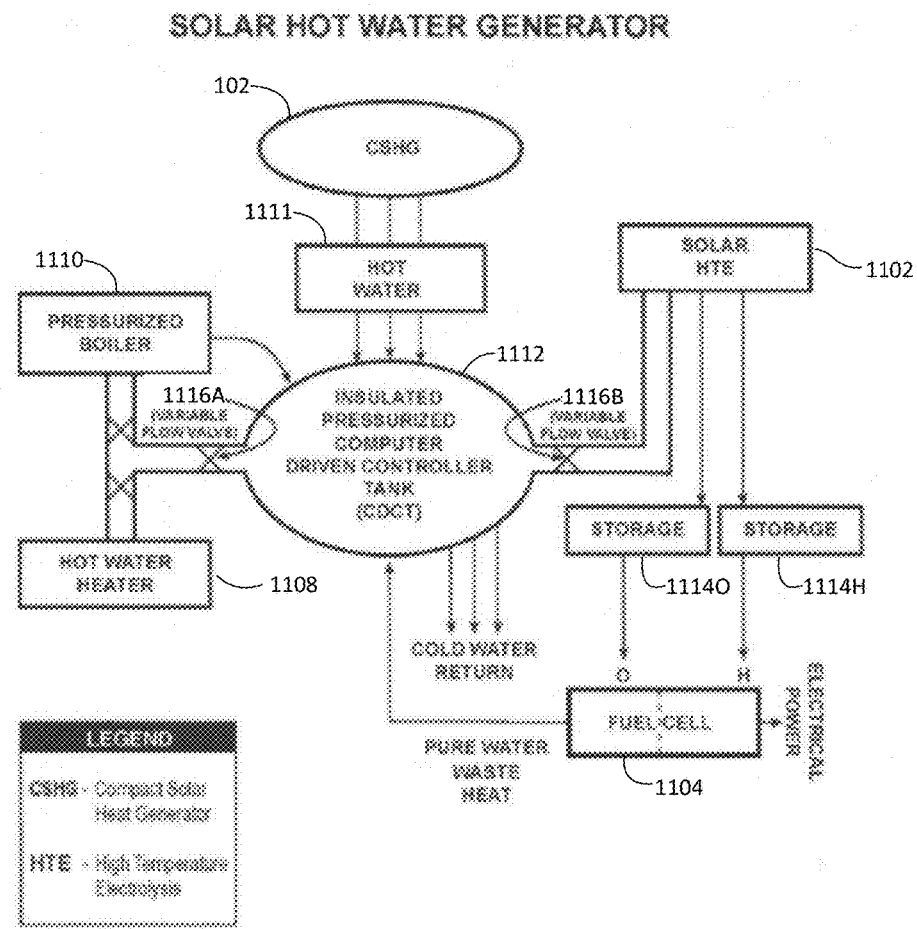
Figure 11 - OPERATIONAL FLOW DIAGRAM FOR EPP

> US 10,164,429 B1

ELECTRICAL POWER PLANT

TECHNICAL FIELD OF THE INVENTION

The present invention relates to an Electrical Power Plant (EPP) serving as a distributed source of electrical power generated through the innovative harnessing of renewable resource systems.

BACKGROUND OF THE INVENTION

There is an expanding need, on a global basis, for renewable electrical generation systems to replace or reduce the petroleum systems currently in use. Cost of silicon panels are being reduced on a daily basis which is beneficial for society. However, there is a greater demand for the innovative harnessing of renewable resource systems to generate electrical power. There is a growing demand to provide total renewable resources systems for cities/States in the near future. There is no single system that can meet this demand. Georgetown, Tex., is an example of a municipality that is powered by renewable electrical power. The state of California has proposed a date of 2045 for total renewable electrical power systems to be installed. This Electrical Power Plant (EPP) described below adds considerably in meeting the demands for renewable electrical power systems on a global basis.

Thus, it would be advantageous to configure power source (s) to be compatible with an urban environmental to enable these benefits of local power generation to be achieved.

It would be further advantageous to produce excess power in the local grid which can then be sent to the national grid, further reducing the requirement for polluting energy generation and transmission losses.

SUMMARY OF THE INVENTION

An Electrical Power Plant (EPP) that serves as a source of distributed electric/stored power generated through the innovative harnessing of renewable resource systems. The systems are mounted on a semi-cone structure with a platform. The solar arrays can be mounted on the frame or platform. Wind turbine systems are limited to installation on the platform.

A "CIMC Unit" (see FIG. 1) performs the functions of:
1) "C"—consolidating all the electrical power generation systems into a single unit to provide power to local users;
2) "I"—an interface function ties together the internal working of the EPP, as well as treating the external components properly;
3) "M"—monitoring the performance of all generator systems and report malfunctions of these systems; and
4) "C"—controlling the system to allow the operator to make any changes necessary to insure proper operation of the system.

An original embodiment was limited to the small, remote locations where the EPP is the primary provider. However, as these renewable energy systems increase in number to include residences, small, medium, and large businesses and the large Selah structure the term local grid will come into vogue. With an increased number of systems, the local grid will become a total renewable resource entity.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized. It should also be realized by those skilled in the art that such constructions do not depart from the scope of the invention as set forth in the appended claims.

BRIEF DESCRIPTION OF THE DRAWINGS

For a more thorough understanding of the present disclosure, and advantages thereof, reference is now made to the following descriptions taken in conjunction with the accompanying drawings, in which:

FIG. 1 is a Functional Flow Diagram of the system showing the two paths for electrical power generation and consolidation into the CIMC Unit and culminating into the local grid.

FIG. 2 is a top view of the semi-cone roof showing the construction beams, the equal height layers for the solar panels along with the mounting platform.

FIG. 3 is a pictorial view of the Selah Structure with the three levels of floor space along with the semi-cone roof showing two pitch angles and the mounting platform.

FIG. 4 is a pictorial view of the Vertical drive wind turbine mounted on the platform and atop the Selah Structure. It also shows the use of the three different floor levels as well as the tear drop shape of the Vertical Wind Turbine enclosure.

FIG. 5 is a detailed view of the Vertical Wind Turbine.

FIG. 6 is a conceptual view of the 360-degree Ramp Guide for the Horizontal drive turbine.

FIG. 7 is a side view of Horizontal Drive Turbine atop the semi-cone roof.

FIG. 8 is a solar array detail showing the various widths of the panels and equal height for the layers.

FIG. 9 is an engineering drawing for a single Parabolic Trough that defines a Slat.

FIG. 10 is a typical array with number of Slats tied together for the generation of hot water.

FIG. 11 is a pictorial view of the operational flow diagram for the solar hot water generator culminating in the Fuel Cell for electrical power and a path for hot water for the Hot Water Heater and/or Boiler.

DETAILED DESCRIPTION OF THE EPP

A unique and innovative semi-cone structure 100 provides a strong and stable platform for mounting the different solar and wind electrical generation systems. The frame provides space for the mounting of the solar arrays 102 while the platform can be utilized where wind is not a factor. All wind turbines 402, 702 are mounted on the platform. The inner space provides three levels: (1) consolidation of the electrical generation systems; (2) living, small business, laboratory, etc., (3) final processing of electrical power for the local grid, water storage, and the geothermal properties of the earth. The system provides for two paths for electrical power generation:
1. Direct electric power generation 110; and
2. Indirect electric and thermal power generation 112.
Power Generation Paths Direct Path—The Direct path 110 comprises two unique and innovative wind generation systems: one 402 with vertical drive and the other 702 with horizontal drive. Both are quiet, esthetically pleasing and suitable for mounting within livable areas. This path also may comprise innovative mounting of Solar Panels with an option for tracking the sun.

Indirect Path—The Indirect path 112 is initiated by the Compact Solar Heat Generator (CSHG) 106 which provides dual paths for electrical power/heat through the Hot Water system 108. This path generates electrical power through a High Temperature Electrolysis (HTE) chamber 1102 to separate the Hydrogen and Oxygen from water to be fed into a Fuel Cell 1104. This path also provides for hot water to feed a hot water heater 1108 or storage in a boiler 1110. The Indirect path 112 provides for multiple Parabolic Troughs 902 that are focused on and track the sun to generate heat for the water in the Collectors 904. The Direct 110 and Indirect 112 paths then feed electrical power into the CIMC Unit 120 to consolidate the electrical power generated by the solar and wind (where available) systems. The CIMC unit 120 interfaces with the internal and external systems as well as providing the Monitor and Control functions. The electrical power generated by the renewable resource systems then feeds the local users grid 130 or national electrical grid 132.

A semi-cone structure 100 (see FIG. 3) provides a platform for the mounting of the electrical/storage generators and houses the CIMC unit 120 as shown in the Function Flow Diagram in FIG. 1. The diameter of the nominal structure is 12.38 m with the height determined by the slope chosen for each site (The 60-degree slope is desirable for most locations). There are sixteen steel girders 202 spaced 22.5 degrees apart that provide the frame for a strong and stable semi-cone roof. The diameter and height of the semi-cone will vary with the type of structure chosen. There are three levels on the nominal structure:
1. The lowest level 302 is primarily below ground to capture the geothermal properties of the earth, energy storage, water storage, and house the CIMC Unit;
2. The ground level 304 provides space for a lab, small business, residence, etc.; and
3. The upper level 306 provides space for the primary generators and for the Maintenance and Repair of the equipment.

A Top View of the structure 100 is shown in FIG. 2 and a Front View in FIG. 3. The elevated frames on the semiconical roof have an option for rotating the solar arrays to ensure that all solar panels 102 are directed into the sun on a daily basis.

Direct Electrical Generator Path

The Direct electrical generator path 110 has two wind turbines: one 402 vertical drive and one 702 horizontal drive. The unique, innovative Vertical drive as shown in FIGS. 4 and 5 develops electrical power to be measured by empirical means in the prototype phase of development. The structure has a tear drop shape, as shown in the Top View, with the small end 704 positioned to face into any high, damaging winds. The tear drop shape also provides space for maintenance and repair of the generation equipment. The unique, innovative Horizontal drive shown in FIG. 7 generates power by empirical means in the prototype phase. Both systems can be installed in close proximity to living areas and are esthetically pleasing. The third system in the Direct Path has solar panels 102 mounted on elevated frames for energy generation and allows for rain water collection, with an option for tracking the sun. The Top View of the solar panels 102 are shown in FIG. 8. The output of the Direct Path is fed into one end of the CIMC Unit 120.

Indirect Electrical Generation Path

The Indirect path 112 for generating electrical power/heat offers a different approach for harnessing renewable energy resources. The heart of this concept lies within the Compact Solar Heat Generator (CSHG) 106 that incorporates the convergence of solar power through parabolic troughs 902 to provide increased heat from the sun. The convergent solar heat is applied to a water filled Collector 904 (at the Focal Point) to raise the temperature to generate hot water 1111. On a daily basis there are two variable actions:
1. The change of the starting point for the suns' position which allows for the focusing of the parabolic troughs 902 in both azimuth and elevation; and
2. The amount of water that is injected at the initial starting point and increases as solar intensity rises to the highest point of elevation in the insulated, pressurized computer-driven controller tank (CDCT) 1112. The amount of water will remain constant throughout the remainder of the heat cycle.

The convergence of the parabolic troughs 902 is shown in FIGS. 9 and 10, culminating in the insulated, pressurized CDCT 1112. This is a powerful concept. The parabolic trough may be constructed from plastic material to decrease total weight and cost. This device can be manufactured using a 3D-Printer. The size of the tank 1112 will be a function of the global zones, the number of slats, and the local modifications: The primary zones are defined by the Tropics and fractional parts of the Temperate zones. Modifications will be elevation, proximity to high mountains, deserts, large bodies of water, etc. The tank size will be further refined during the Prototype Phase of development. A small water pump will provide the force to provide electrical power or hot water.

The Indirect path 112 has dual paths for the generated hot water: a hot water 1111 system that provides heat to the solar High Temperature Electrolysis (HTE) Chamber 1102 to improve the efficiency of separating the Hydrogen (H) and Oxygen (O) from water. The hydrogen and oxygen (both in gaseous form) are then dried, compressed, and stored in insulated tanks 1114H and 1114O, respectively, and made ready for input to the Fuel Cells 1104. The output of the Fuel Cells 1104 has three components: electrical power, pure water, and co-generative heat to be fed into the pressurized CDCT 1112. The hot water system also provides heat for the Hot Water Heater 1108/Boiler 1110.

Operational Flow Diagram

FIG. 11 is an operational flow diagram for indirect power generation system of the Solar Hot Water Generator. The compact solar heat generator at the top generates hot water 1111 which is fed into an insulated, pressurized computer-driven CDCT 1112. Two variable flow valves 1116A and 1116B enable the hot water in the CDC tank to be directed either to a Hot Water Heater 1108/pressurized Boiler 1110 or to a solar high-temperature electrolysis system 1102 for generating hydrogen and oxygen (from water) to be piped to Fuel Cells 1104. The system can provide electrical power or hot water at the same time.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. The invention has broad applicability and can provide many benefits as described and shown in the examples above. The embodiments will vary greatly depending upon the specific application, and not every embodiment will provide all of the benefits and meet all of the objectives that are achievable by the invention.

In the following discussion and in the claims, the terms "including" and "comprising" are used in an open-ended fashion, and thus should be interpreted to mean "including, but not limited to . . . ." To the extent that any term is not specially defined in this specification, the intent is that the term is to be given its plain and ordinary meaning. The accompanying drawings are intended to aid in understanding the present invention and, unless otherwise indicated, are not drawn to scale.

The various features described herein may be used in any functional combination or sub-combination, and not merely those combinations described in the embodiments herein. As such, this disclosure should be interpreted as providing written description of any such combination or sub-combination.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An electrical power plant ("EPP"), comprising:
   a building structure including a roof shaped as a truncated cone having an outer conical surface area and a truncated end;
   a direct power generation system, including:
      a vertical wind turbine extending from the truncated end of the roof of the building structure;
      a horizontal wind turbine supported by the building structure above the truncated end of the roof; and
      photovoltaic panels supported by the building structure;
   an indirect power generation system supported by the building structure and including:
      a compact solar heat generator containing water;
      a solar high-temperature electrolysis chamber, configured to electrolyze the water to produce hydrogen and oxygen; and
      a Fuel Cell, configured to be fueled by the hydrogen and oxygen from the solar high-temperature electrolysis chamber.

2. The electrical power plant of claim 1 further comprising a CIMC unit, wherein the CIMC unit consolidates the output of the direct power generation system and the output of the indirect power generation system into a single electrical power output and provides the single electrical power output to a local grid.

3. The electrical power plant of claim 1 further comprising a CIMC unit, wherein the functions of the CIMC Unit include monitoring performance of the direct power generation system and the indirect power generation system and reporting malfunctions of the direct power generation system and the indirect power generation system.

4. The electrical power plant of claim 1 further comprising a CIMC unit, wherein the functions of the CIMC unit include controlling the EPP to allow an operator to make any changes necessary to insure proper operation of the EPP.

5. The electrical power plant of claim 1, wherein the photovoltaic panels are mounted on the outer conical surface area of the roof of the building structure on an elevated metal frame with an option for tracking the sun.

6. The electrical power plant of claim 1, further comprising a CIMC unit, wherein the CIMC unit consolidates the output of the direct power generation system and the output of the indirect power generation system into a single electrical power output wherein the single electrical power output is transmitted to users near the electrical power plant.

7. The electrical power plant of claim 1, further comprising a CIMC unit, wherein the CIMC unit consolidates the output of the direct power generation system and the output of the indirect power generation system into a single electrical power output wherein the single electrical power output is transmitted onto a main power grid.

8. The electrical power plant of claim 1, wherein the compact solar heat generator comprises a multiplicity of parabolic troughs, wherein each parabolic trough concentrates light onto an associated collecting pipe, thereby heating the water in the associated collecting pipe to generate hot water.

9. The electrical power plant of claim 8, wherein the hot water from each of the associated collecting pipes is directed to a computer-driven controller tank (CDCT).

10. The electrical power plant of claim 8, wherein the hot water from the CDCT is directed to a pressurized boiler and/or hot water tank.

11. The electrical power plant of claim 8, wherein the hot water from the CDCT is directed to the solar high-temperature electrolysis chamber.

12. An electrical power plant, comprising:
   a building structure including a roof shaped as a truncated cone having an outer conical surface area and a truncated end;
   a direct power generation system supported on the building structure, including:
      a vertical wind turbine extending from the truncated end of the roof of the building structure;
      a horizontal wind turbine turbine supported by the building structure above the truncated end of the roof; and
      photovoltaic panels supported on the outer conical surface, wherein the photovoltaic panels are mounted on the roof of the structure on an elevated metal frame with an option for tracking the sun;
   an indirect power generation system supported by the building structure, including:
      a compact solar heat generator;
      a solar high-temperature electrolysis chamber, configured to electrolyze water to produce hydrogen and oxygen; and
      a fuel cell, configured to be fueled by the hydrogen and oxygen from the solar high-temperature electrolysis chamber; and
   a CIMC unit within the building structure, wherein the functions of the CIMC unit include:
      consolidating all the electrical power generation systems into a single unit to provide power to local users;
      tying together the internal working of the EPP, as well as treating the external components properly;
      monitoring the performance of all generator systems and report malfunctions of these systems; and
      controlling the system to allow the operator to make any changes necessary to insure proper operation of the system.

13. The electrical power plant of claim 12, wherein electrical consolidated by the CIMC unit is transmitted to users near the electrical power plant and/or onto the main power grid.

14. The electrical power plant of claim 12, wherein the compact solar heat generator comprises a multiplicity of parabolic troughs, wherein each parabolic trough concentrates light onto an associated collecting pipe, thereby heating the water in the associated collecting pipe to generate hot water, and wherein the hot water is directed to a computer-driven controller tank (CDCT).

15. The electrical power plant of claim 14, wherein the hot water is directed from the CDCT to a pressurized boiler and/or hot water tank.

16. The electrical power plant of claim 14, wherein the hot water is directed from the CDCT the solar high-temperature electrolysis chamber.

\* \* \* \* \*